P. O. SOHN.
GRAIN SEPARATOR.
APPLICATION FILED MAY 29, 1919.

1,317,181.

Patented Sept. 30, 1919.
5 SHEETS—SHEET 5.

INVENTOR
Peter O. Sohn
BY HIS ATTORNEYS

UNITED STATES PATENT OFFICE.

PETER O. SOHN, OF ZUMBROTA, MINNESOTA.

GRAIN-SEPARATOR.

1,317,181.  Specification of Letters Patent.  Patented Sept. 30, 1919.

Application filed May 29, 1919. Serial No. 300,626.

*To all whom it may concern:*

Be it known that I, PETER O. SOHN, a citizen of the United States, residing at Zumbrota, in the county of Goodhue and State of Minnesota, have invented certain new and useful Improvements in Grain-Separators; and I do hereby declare the following to be a full, clear, and exact description of the invention, such as will enable others skilled in the art to which it appertains to make and use the same.

My invention relates to improvements in grain separators and has for its object to provide such a machine that is not only highly efficient in its action, but easy to adjust for the separation of various different kinds of grain, with few parts that are subject to wear and liable to get out of order, and economical to build.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:—

Fig. 6 is a view in rear end elevation of the upper and lower shoes, as shown in Fig. 3.

Figure 1:
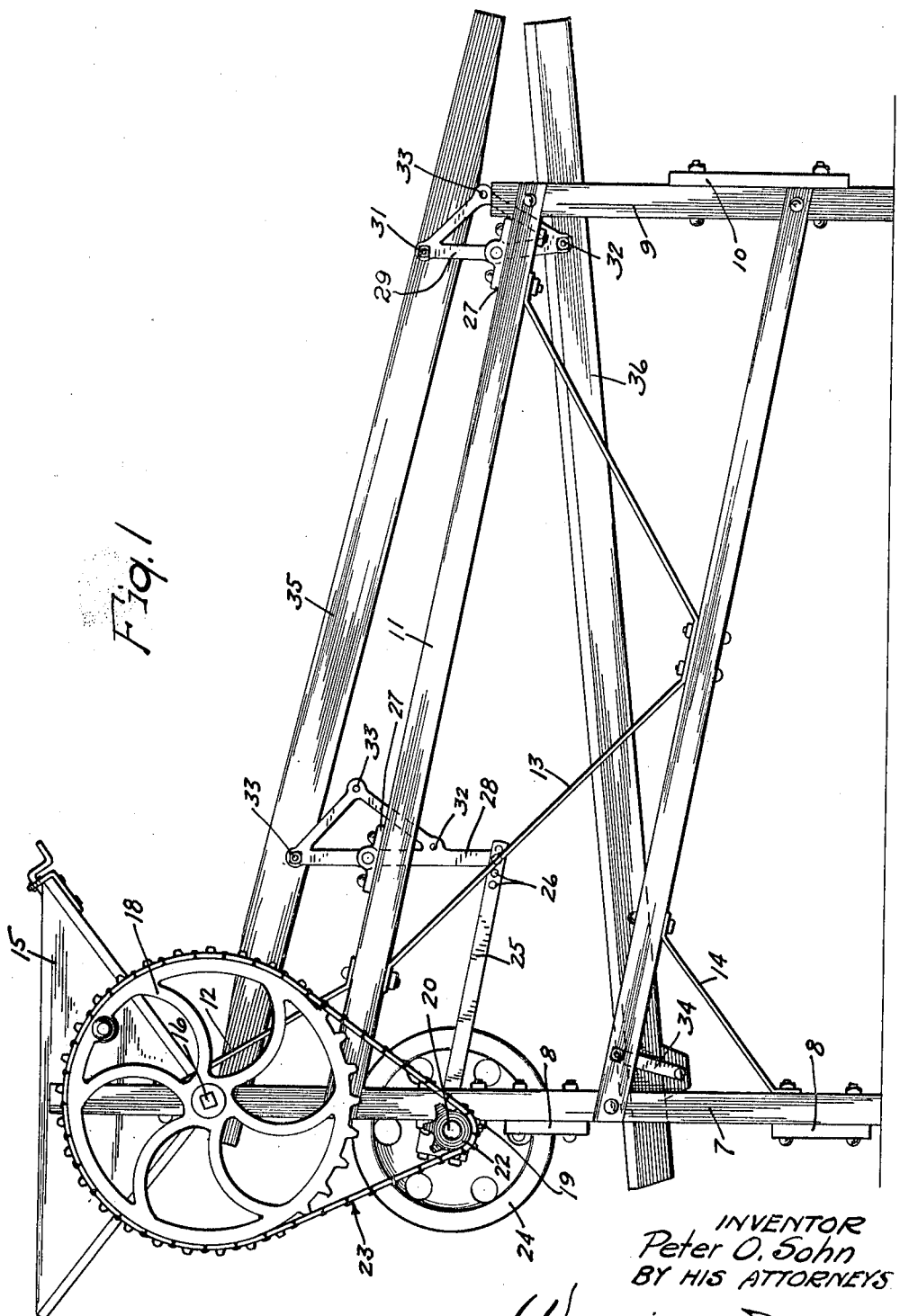
Figure 1 is a side elevation, showing one adjustment of the improved machine.

The frame of the improved grain separator comprises a pair of relatively long front legs 7, upper and lower end boards 8 rigidly connecting said front legs, a pair of relatively short rear legs 9, a single wide end board 10 rigidly connecting said rear legs, upper and lower forwardly inclined side rails 11 connecting the front and rear legs on each side of the machine, braces 12 between the upper end portion of the front legs 7 and the upper side rails 11, diverging braces 13 between the upper and lower rails 11, and braces 14 between the front legs 7 and lower side rails 11.

A hopper 15 is rigidly secured to and between the extreme upper end portions of the front legs 7, and has in its feed opening a feed shaft 16 journaled in the front legs 7. This feed shaft 16 is, as shown, square in cross section and has secured to its right-hand end, outward of the frame a large hand-piece-equipped sprocket wheel 18.

Bearings 19 are secured to the outer faces of the front legs 7 and have journaled therein a shaft 20, provided with two cranks or offset portions 21 located just inward of said legs. Keyed to the right-hand end of the shaft 20 is a relatively small sprocket wheel 22, alined with the sprocket wheel 18, and over which two sprocket wheels runs a sprocket chain 23. On the other end of the shaft 20 is a fly-wheel-equipped pulley 24, over which runs a driving belt, not shown. Rearwardly projecting pitmen 25 have their forward ends connected, one to each of the cranks 21, and in their rear ends are longitudinally spaced holes 26, for a purpose that will presently appear.

Intermediately fulcrumed to the bearings 27 on the upper edge of each side rail 11 is a front rocker lever 28, and a rear rocker lever 29. The lower ends of the rocker levers 28 are extended to increase their operative lengths, and are adjustably connected by pins 30 to any one of the set of bores 26, in pitmen 25. Each rocker lever 28 and 29 is provided with bearings 31, 32 and 33, located on radial lines from the fulcrum of said levers. It will be noted that the bearings 31 are located above the fulcrums for the levers 28 and 29 and in the same vertical planes therewith, while the bearings 32 are located below said fulcrums, and slightly forward of said vertical planes.

As shown, all of the bearings 31 and the bearings 33 of the front rocker levers 29 are equi-distant from the fulcrums of the levers 28 and 29 and that all of the bearings 32 are also approximately equi-distant from said fulcrums but slightly nearer said fulcrums than the bearings 31 and that the distance of the bearings 33 of the rear rocker levers 29, from the fulcrums of said levers 29, is slightly less than the distance of the bearings 33 of the front rocker levers 28 from the fulcrum of said levers 28. Attached to the lower side rails 11, at the front of the machine, is a pair of links 34, for a purpose that will presently appear.

Figure 2:
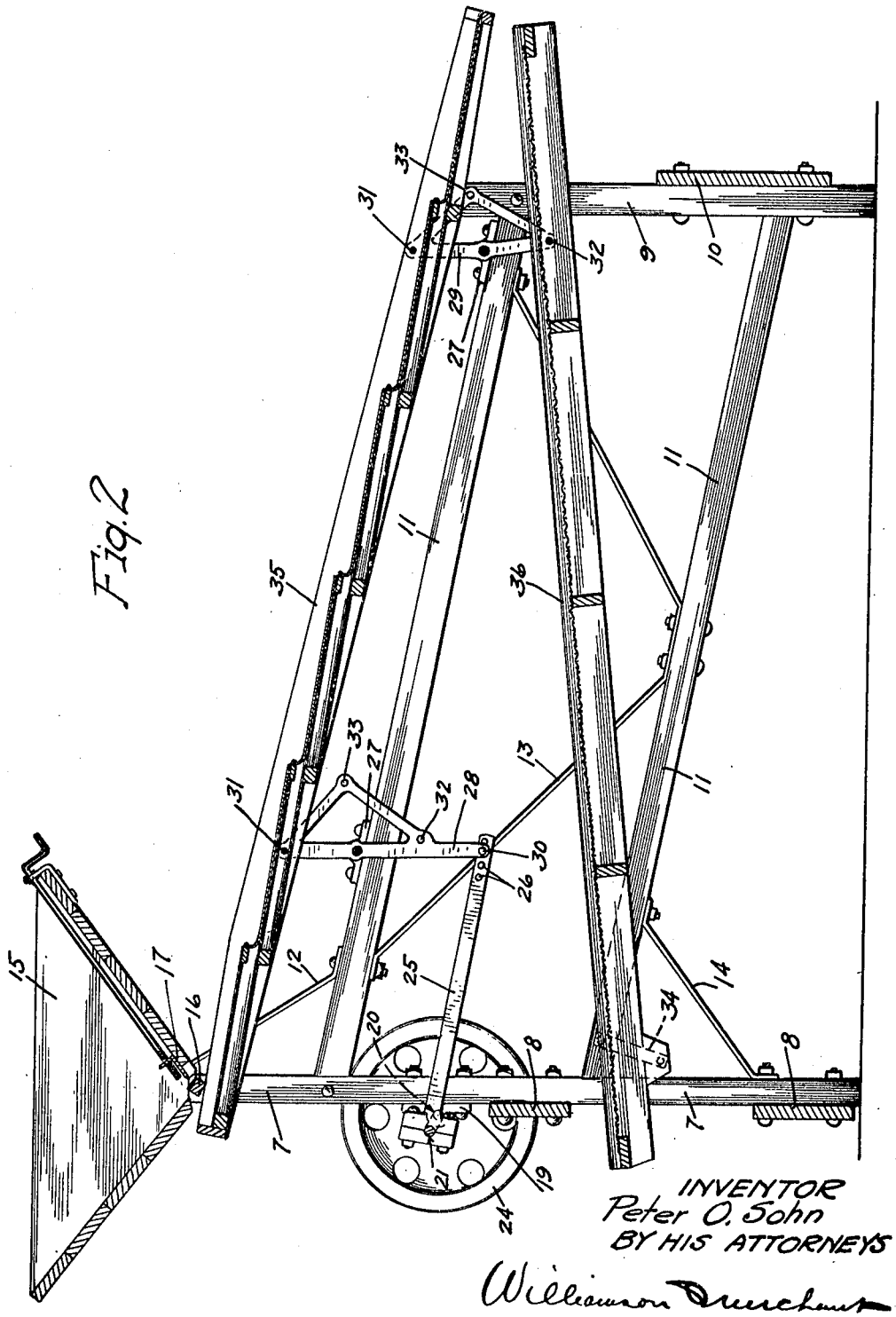
Fig. 2 is a view in longitudinal vertical section, taken centrally through the machine as adjusted in Fig. 1.

The improved machine, as shown in Figs. 1 and 2, is provided with upper and lower sieve-equipped shoes 35 and 36, respectively, designed for the separation of succotash, wheat and oats. The upper shoe 35 is pivotally connected to the bearings 31, and the receiving end of the lower shoe 36 is pivotally connected to the bearings 32 of the rocker lever 29, and the delivery end thereof is pivotally connected to the lower ends of the links 34.

In the mounting of the two shoes 36 and 35, which are inclined in opposite directions, the receiving end of the former is at the front of the machine, and the receiving end of the latter is at the rear end thereof. The sieve-equipped shoe 35 is designed to remove oats which are tailed over the delivery end of said shoe at the rear end of the machine. The wheat, precipitated with the pin oats, and screenings onto the lower sieve-equipped shoe 36, is tailed over the delivery end of said lower shoe. In this adjustment of the machine, the rocker levers 28 are attached to the third set of bores 26 in the pitmen 25 from the front of the machine to cause a slight raise in the upper shoe during its final backward movement, and a slight drop therein during its initial forward movement, thereby increasing the capacity of the machine by causing the materials to travel faster thereon.

Figure 3:
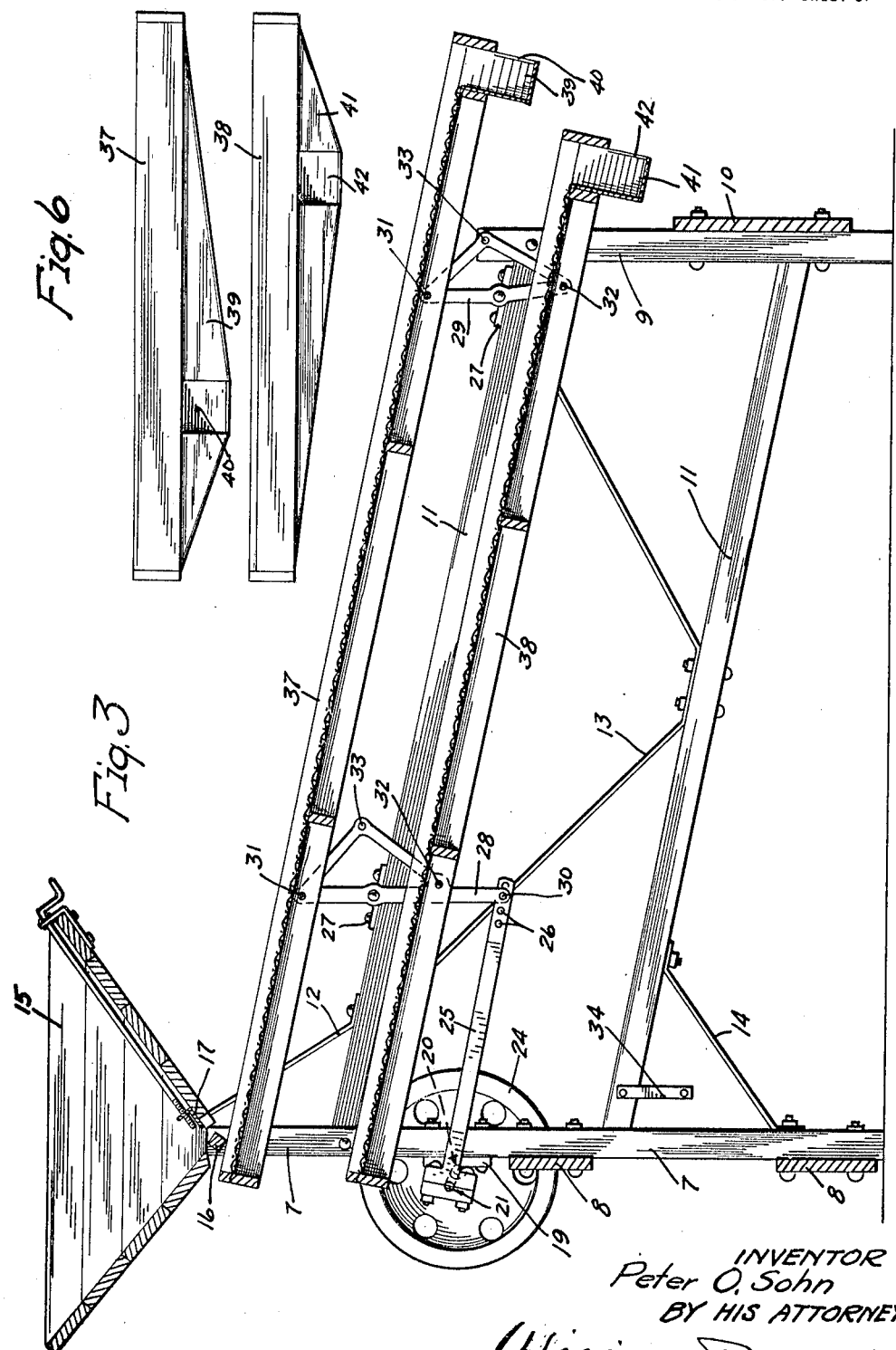
Figs. 3 and 4 are views corresponding to Fig. 1, but each showing a different adjustment of the machine.

In Fig. 3 the improved machine is equipped with upper and lower sieve-equipped shoes 37 and 38 designed to separate flax from wheat. In this adjustment of the machine, the upper shoe 37 is pivotally attached to the bearing 31, and the lower shoe 38 is pivotally attached to the bearings 32 for parallel and reverse movements. The wheat separated by the upper shoe 37 is collected at the delivery end thereof in a transverse trough 39 having a hopper-like bottom and a discharge opening 40. Flax precipitated onto the lower sieve-equipped shoe 38 is collected at the delivery end thereof in a transverse trough 41, also having a hopper-like bottom and a discharged spout 42. It will be noted that the delivery end of the upper shoe 37 extends outward of the delivery end of the lower shoe 38, and by reference to Fig. 6, it will be noted that the discharge openings 40 and 42 are laterally offset from each other, so as to keep the wheat and flax separate.

Figure 4:
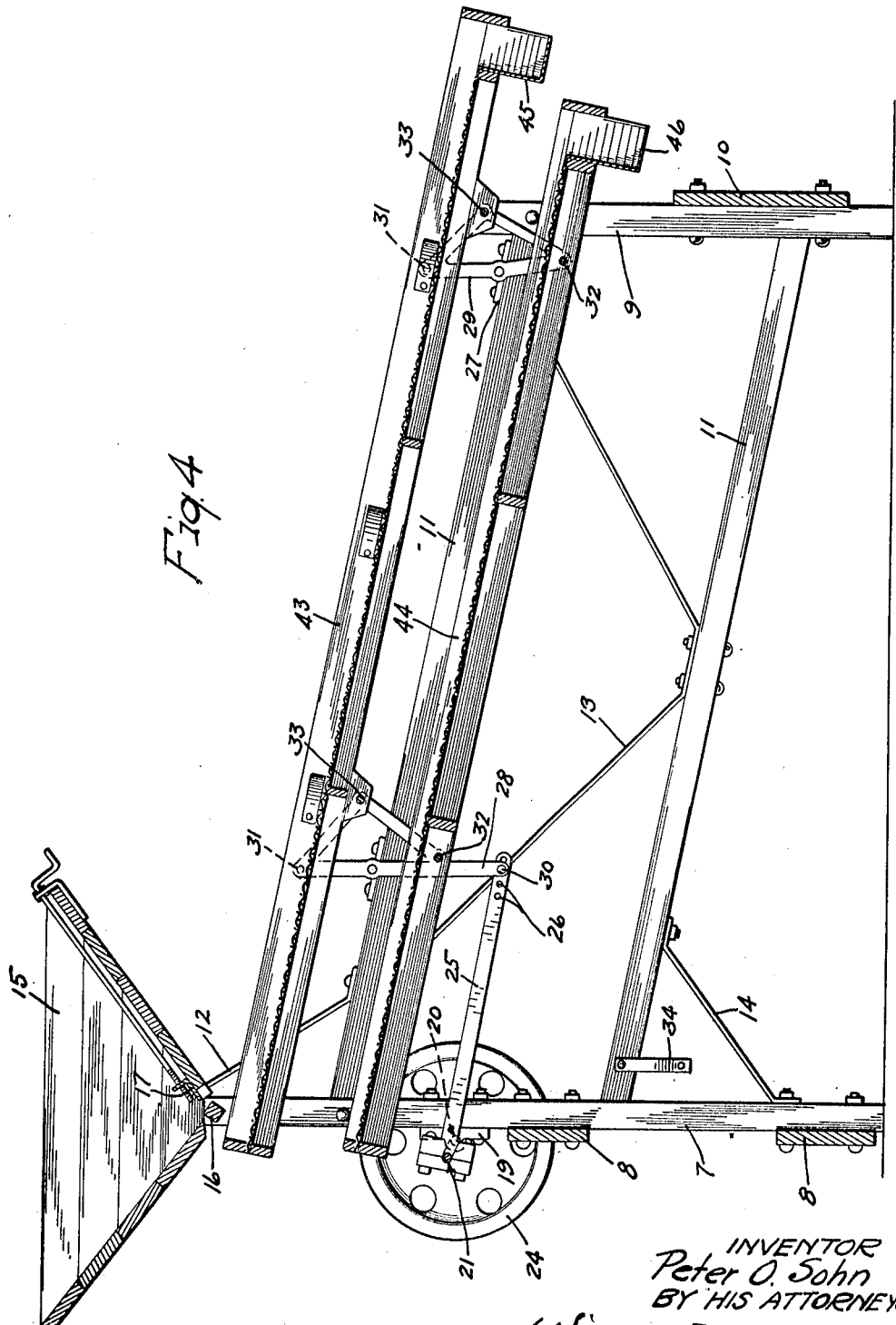
Figure 5:
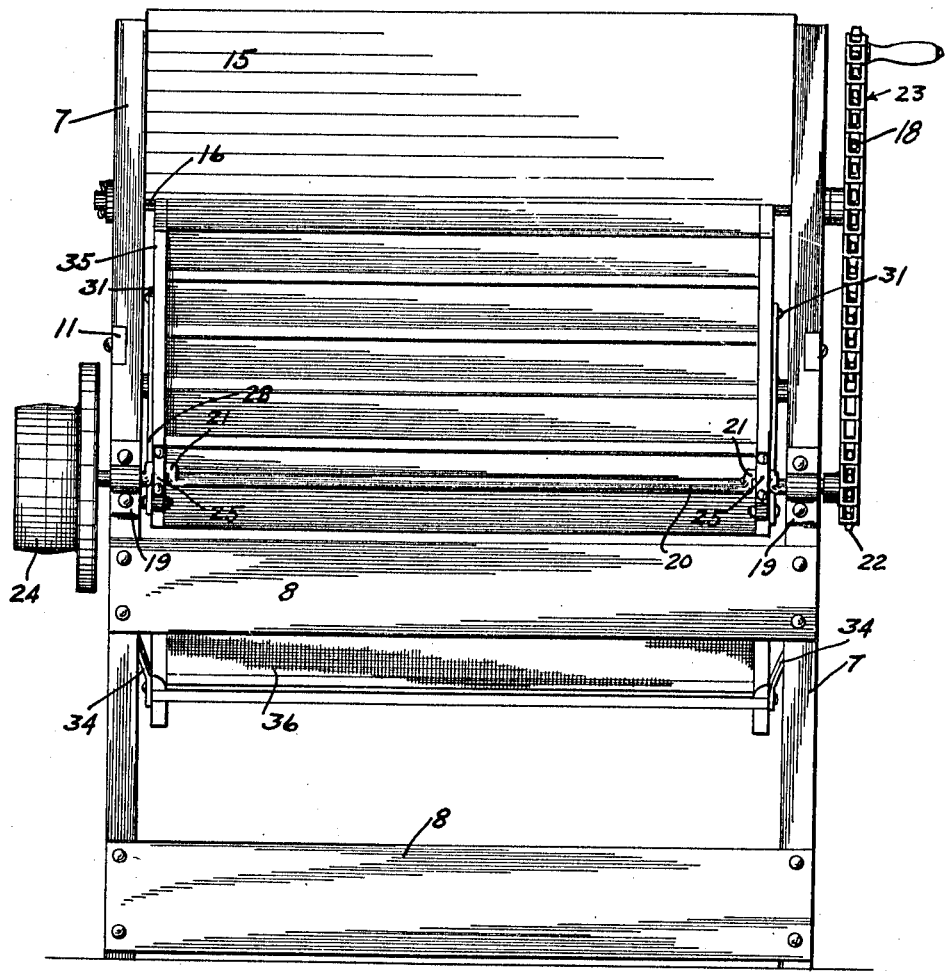
Fig. 5 is a front elevation of the machine as adjusted in Fig. 1.

In Fig. 4, the improved machine is equipped with lower and upper sieve-equipped shoes 43 and 44, respectively, designed for use in the separation of the wild oats from barley. In this adjustment of the machine, the upper shoe 43 is pivotally attached to the bearings 33, and the lower shoe 44 is pivotally attached to the bearings 32. Owing to the peculiar relation of the bearings 33 to the fulcrums for the rocker levers 28 and 29, the upper shoe 43 is given more of a lifting movement at its receiving end, during its final backward movement, than at the delivery end thereof. The action of the upper shoe 43 throws oats therefrom and permits the same to turn on end, due to the fact that one end is heavier than the other, and pass through the sieve of the upper shoe, together with the barley screenings. The barley, separated by the upper shoe, is collected at the delivery end thereof in a transverse trough 45 having a hopper bottom and a discharge opening. The wild oats and barley screenings, separated by the upper sieve, are collected in a transverse trough 46 having a hopper bottom and a discharge opening.

From the above description, it is evident that the improved machine may be very quickly adjusted for the separation of various different kinds of grain.

What I claim is:—

1. The combination with a frame, of front and rear pairs of rocker levers intermediately fulcrumed on said frame, said levers having upper, lower and intermediate bearings, said intermediate bearings being horizontally offset from the fulcrums of said levers, sieve-equipped shoes shiftably supported for different adjustments from said bearings, and means for oscillating at least one of said levers.

2. The combination with a frame, of front and rear pairs of rocker levers intermediately fulcrumed on said frame, said levers having upper, lower and intermediate bearings, said intermediate bearings being horizontally offset from the fulcrums of said levers, sieve-equipped shoes shiftably supported for different adjustments from said bearings, and a crank actuated pitman, the lower end of one of said levers being extended and adjustably connected to said pitman.

3. The combination with a frame, of front and rear pairs of rocker levers intermediately fulcrumed on said frame, said levers having upper, lower and intermediate bearings, said intermediate bearings being horizontally offset from the fulcrums of said levers, and located above the horizontal plane of said fulcrums, sieve-equipped shoes shiftably supported for different adjustments from said bearings, and means for oscillating at least one of said levers.

4. The combination with a frame, of front and rear pairs of rocker levers intermediately fulcrumed on said frame, said levers having upper, lower and intermediate bearings, the intermediate bearings of the front pair of levers having longer radii than the corresponding bearings of the rear pair of said levers, sieve-equipped shoes shiftably supported for different adjustments from said bearings, and means for oscillating at least one of said levers.

5. The combination with a frame, of front and rear pairs of rocker levers intermediately fulcrumed on said frame, said levers having upper, lower and intermediate bearings, said upper bearings being located in the upper planes of the fulcrums of said levers and said lower bearings being offset therefrom, and sieve-equipped shoes, shiftably supported for different adjustments from said bearings, and means for oscillating at least one of said levers.

In testimony whereof I affix my signature in presence of two witnesses.

PETER O. SOHN.

Witnesses:
OTTO G. OLSON,
A. J. TRELSTAD.

Copies of this patent may be obtained for five cents each, by addressing the "Commissioner of Patents, Washington, D. C."